United States Patent [19]
Brewer et al.

[11] 4,363,125
[45] Dec. 7, 1982

[54] MEMORY READBACK CHECK METHOD AND APPARATUS

[75] Inventors: James A. Brewer, Boulder, Colo.; John A. Lowy, Tucson, Ariz.

[73] Assignee: International Business Machines Corporation, Armonk, N.Y.

[21] Appl. No.: 106,633

[22] Filed: Dec. 26, 1979

[51] Int. Cl.³ .................. G06F 11/00; G11C 29/00
[52] U.S. Cl. ................................ 371/71; 371/38
[58] Field of Search .................... 371/71, 38, 51; 364/900; 360/53, 31

[56] References Cited

U.S. PATENT DOCUMENTS

| | | | |
|---|---|---|---|
| 2,871,289 | 1/1959 | Cox et al. | 178/23 |
| 2,954,432 | 9/1960 | Lewis | 178/23 |
| 3,085,230 | 4/1963 | Shoultes et al. | 340/172.5 |
| 3,096,511 | 7/1963 | Taras | 371/71 |
| 3,651,471 | 3/1972 | Haselwood et al. | 364/900 |
| 3,751,649 | 8/1973 | Hart, Jr. | 371/71 |
| 3,794,818 | 2/1974 | Kennedy | 371/71 |
| 3,940,601 | 2/1976 | Henry et al. | 371/71 |
| 3,982,226 | 9/1976 | Bunker et al. | 371/38 |
| 4,005,405 | 1/1977 | West | 371/38 |
| 4,028,666 | 6/1977 | Suzuki et al. | 340/172.5 |
| 4,045,779 | 8/1977 | Markle | 371/71 |

OTHER PUBLICATIONS

T. H. Rowe, Write Check Feature, IBM Technical Disclosure Bulletin, vol. 5, No. 2, Jul. 1962, p. 43.
Mosser et al., Stored Cyclic Redundancy Check Buffered Data Integrity Checking, IBM Technical Disclosure Bulletin, vol. 18, No. 10, Mar. 1976, pp. 3256–3257.
Patel, Twined Interleaving of Data on a Multitrack Storage Medium, IBM Technical Disclosure Bulletin, vol. 18, No. 6, Jan. 1976, pp. 2628–2630.
SA400 Minifloppy TM Diskette Storage Drive OEM Manuel, Shugart Associates, Revision 5, 1977, p. 34.
Systems Reference Manual for IBM 3830 Storage Control and IBM 3330 Disk Storage, IBM Corporation, Third Edition, Apr. 1972, p. 7.
P. H. Hall, IBM Technical Disclosure Bulletin, vol. 15, No. 3, Aug. 1972, pp. 1027–1028, "Write Checking Using Cyclic Redundancy Checks".
Oldham et al., IBM Journal of Research and Development, vol. 12, No. 6, Nov. 1968, pp. 422–430, "Error Detection and Correction in a Photodigital Storage System".

Primary Examiner—Charles E. Atkinson
Attorney, Agent, or Firm—John H. Hocolmbe

[57] ABSTRACT

A high speed readback check of data transferred to a cyclic memory before the data source is lost. The cyclic memory is organized into a number of data blocks, each interleaved with or simultaneously accessible with the other data blocks. Thus, a long data record comprises several data blocks and therefore several cycles of the memory. A readback check of data transferred from a source into the memory is accomplished by writing data into one data block in a first cycle, writing data into another block on the second cycle while reading back the first data block and calculating a check character therefrom, continuing through the writing of the entire record, and reading the last block of written data and calculating the check character, and then comparing the calculated check character with a character calculated from the source data to detect any error before the source of the record is lost.

10 Claims, 8 Drawing Figures

MEMORY READBACK CHECK METHOD AND APPARATUS

BACKGROUND OF THE INVENTION

A. Field of the Invention

This invention relates to high speed cyclic memories, and more particularly to a high speed check of the accuracy of the data written therein.

B. Description of the Prior Art

In digital data handling systems, data is transferred at high speed and in parallel. However, where data is transferred over communication lines, usually in serial fashion, the transfer rate is relatively slow and not matched to the high speed of the data handling system. Therefore, buffers are used to accumulate small portions of slow incoming data and supply it at high rates to the receiving system, normally to the memory of the receiving system. Once the portion of the data is supplied to the receiving system, the buffer is available to accumulate another portion of the slow incoming data. As the further incoming data its accumulated, it destroys the previous portion of the data.

Should the high speed transfer of the previous portion of the data result in an error which was not detected until further incoming data is accumulated, the previous data could not be retransferred from the buffer to correct the error, and the data would be lost. Only a slow, time-consuming retransmission of the data from the originating source would recover the lost data.

A prior attempt at solving this problem comprised the use of extensive error correcting codes that accompany the data and are devised to correct the most likely occurring errors. However, to be useful and actually correct nearly all such errors, the added code data calculated in accordance with the codes and supplied along with the data is considerable, often ten percent of the original data and sometimes more. The addition of so much code data can be both time-consuming and uneconomical.

SUMMARY OF THE INVENTION

It is therefore an object of the present invention to provide method and apparatus for a high speed readback check of transferred data to detect any error before the immediate source (e.g., buffer) of the data is lost.

Briefly, input data check method and apparatus are provided for a cyclic memory of the receiving system. The check apparatus receives the data as stored in the memory over a plurality of cycles. The data stored in the memory in each cycle is read back in a subsequent cycle. The received data and the data read back are compared to detect any difference therebetween.

DETAILED DESCRIPTION

Figure 1:
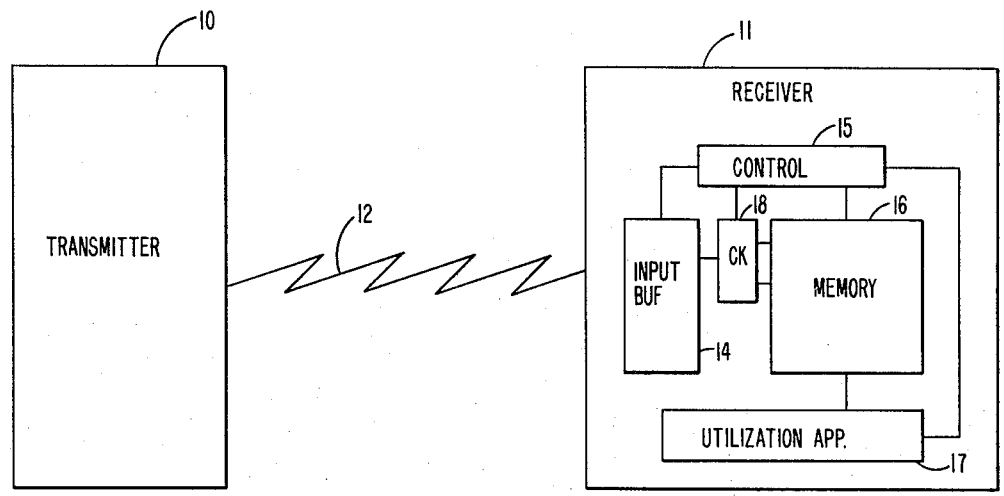
FIG. 1 is a diagrammatic illustration of a preferred application of the present invention.

Referring to FIG. 1, a transmitter 10 is in communication to a receiver 11 over a communication link 12. The communication link may comprise a telephone, cable, radio, or other suitable link, and the transmitter and receiver may comprise half of a duplex arrangement. The data received from transmitter 10 is temporarily stored in an input buffer 14 under the direction of control 15. A significant amount of data is stored in the input buffer 14 and then transferred to a memory 16 for subsequent use by a utilization apparatus 17, all under the direction of control 15.

Input buffer 14 is thus the source of the data for memory 16, receiving data and transferring it to the memory and writing over the transferred data with data subsequently received. In accordance with the invention, checking circuitry 18 is supplied and operates under the direction of control 15 in cooperation with memory 16 to check the data stored therein prior to loss of the data in input buffer 14 by subsequently received data. Memory 16 is a cyclic memory organized into a number of data blocks, each interleaved with or simultaneously accessible with the other data blocks. During a first cycle of the memory, a data block is written into memory 16. During the second cycle, a second block of data is written into memory 16 while the first data block is read back and checked by circuitry 18 for correctness against the corresponding data originally supplied from buffer 14. The readback and checking continues until an entire record received from input buffer 14 is stored in memory 16 and checked for accuracy.

A suitable control 15 is illustrated in U.S. Pat. No. 4,086,658, Finlay, issued Apr. 25, 1978 and assigned in common with the present application. That patent illustrates a working store or memory 172, which comprises the input buffer 14 of FIG. 1 herein as well as input registers 173 for communication with the communication line 12 in FIG. 1 herein. The patent further describes a page memory 64 for which the present memory 16 is substituted. The patent further describes a copy production machine 10 which may comprise the utilization apparatus 17 herein. The connections and control circuitry are as described in the patent except where specifically described hereinafter. As described in the patent, control 15 of the receiver operates in two phases, an addressing phase and a data transfer phase, both phases constituting a machine cycle.

Figure 2:
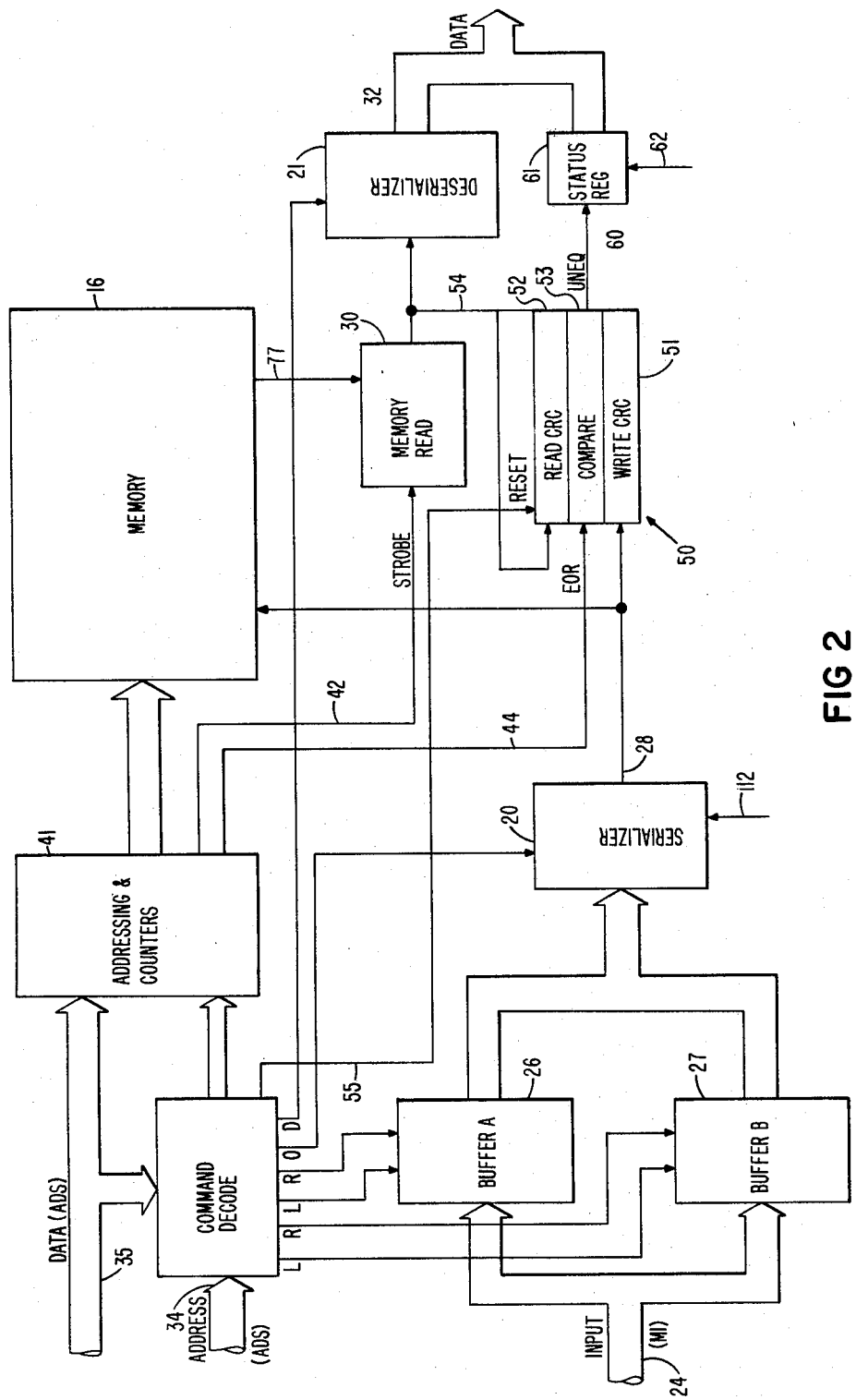
FIG. 2 is a block diagram of a preferred embodiment of the present invention in conjunction with a memory.

Referring to FIG. 2 herein, memory of FIG. 1 is illustrated as including serializer 20 and deserializer 21. Data for the memory is received on a byte basis of 8 binary bits in parallel from input cable 24. The input cable is connected to input byte buffers 26 and 27. The incoming data is gated to one of the two input buffers and then transferred to serializer 20, where the data is converted into serial form and supplied on line 28 to memory 16. Data stored in the memory 16 is presented serially and detected by memory read circuit 30 to be supplied to deserializer 21. Deserializer 21 accumulates eight bits of data and supplies a parallel byte of data on output bus 32. Since memory 16 operates in serial fashion with the data, as opposed to parallel fashion for the data in the receiver system, the speed, or bit rate, of memory 16 is a great deal faster, e.g. eight times, than the byte rate of the receiver system.

The receiver system operates in the above two phases, a command and addressing phase, and a data transfer phase. The command and address information is supplied on address, data bus 34, 35 which is 16 bits wide. The command and addressing information is supplied to command decode circuit 40 and addressing and counter circuitry 41. Command decode circuitry 40 operates buffers 26 and 27 and serializer 20 as well as supplying control inputs to addressing and counter circuitry 41. Addressing and counter circuitry 41 addresses the initial block of memory 16 and keeps track of the cycles of the memory for controlling the reading and writing of each block of data in the appropriate cycles. It also supplies a strobe signal on line 42 to operate memory read circuitry 30, and supplies an end of record signal on line 44 to operate check circuitry 50.

The incoming data from serializer 20 is also supplied to shift register 51 of check circuitry 50. Data detected from memory 16 by memory read circuitry 30 is supplied on line 54 to shift register 52 of check circuitry 50. Shift registers 51 and 52 are identical, including appropriate feedback loops to calculate a redundancy check character. Command decode circuitry 40 supplies a POR signal (Power On Reset) on line 55 which resets both shift register 51 and shift register 52 to an all one's state. The incoming data to each shift register is continually shifted and fed back to calculate a redundancy character. After a complete record has been loaded into memory 16 and the data read back by circuitry 30 into shift register 52, the signal on line 44 operates a compare circuit 53 to compare the content of the two shift registers 51 and 52. Should the comparison be equal, no signal is supplied on output line 60 to a status register 61. The status register 61 thus continues to assume a first state indicating by its bit pattern that the comparison is equal. Should the comparison be unequal, compare circuitry 53, when actuated by the signal on line 44, supplies an output signal on line 60 to status register 61. The status register responds by switching to a second bit pattern indicating that the comparison was unequal. At predetermined times in the operation of control 15 of FIG. 1, a command is sent to interrogate the status of status register 61, represented by a signal on line 62. The status register then supplies the bit pattern thereof on the output bus 32.

Shift registers such as 51 and 52 with the appropriate feedback and the associated compare circuitry 53 are well known. For example, the shift registers 51 and 52 arranged for cyclic redundancy character (CRC) generation may comprise 16 bit registers with feedback in accordance with the commonly used polynomial $X^{16}+X^{12}+X^5+1$.

Command decode circuitry 40 operates in response to the command and address signals and the system clock to gate data from the input bus 24 to serializer 20 by first supplying a signal on the load line ("L") to buffer 26 for the first byte, operating the load line for buffer 27 for the next byte while operating the read line ("R") to buffer 26 to transfer the first byte to serializer 20. An operate signal ("O") is supplied to serializer 20 to load the data from the buffer 26 or 27 and transmit the data in serial form on line 28. The third byte of data is supplied to buffer 26 by the operation of the load line thereon while the read line for buffer 27 is operated to transmit the second byte of data to serializer 20. The alternate use of the buffers 26 and 27 continues for the transmission of the entire record. Other input or serializing arrangements may be employed, and the presently described arrangement is purely exemplary. The input bus 24 actually comprises nine lines for the eight bits in the byte of information and another line for a parity bit. The parity bit checking circuitry is not shown for the purpose of simplification.

Memory 16 may comprise any of several high speed cyclical memories, including semiconductor, delay line, and CCD. An example of a commercially available CCD memory is the Texas Instruments TMS 3064 JL 65, 536-bit CCD memory. In analogizing memory 16 to a rotating cyclic memory such as described in U.S. Pat. No. 3,176,279, A. D. Lin, et al, Ser. No. 792,168, filed Feb. 9, 1959, and assigned in common with the present application, cycles are as defined therein (Col. 5, lines 3-6) as complete revolutions.

Figure 3:
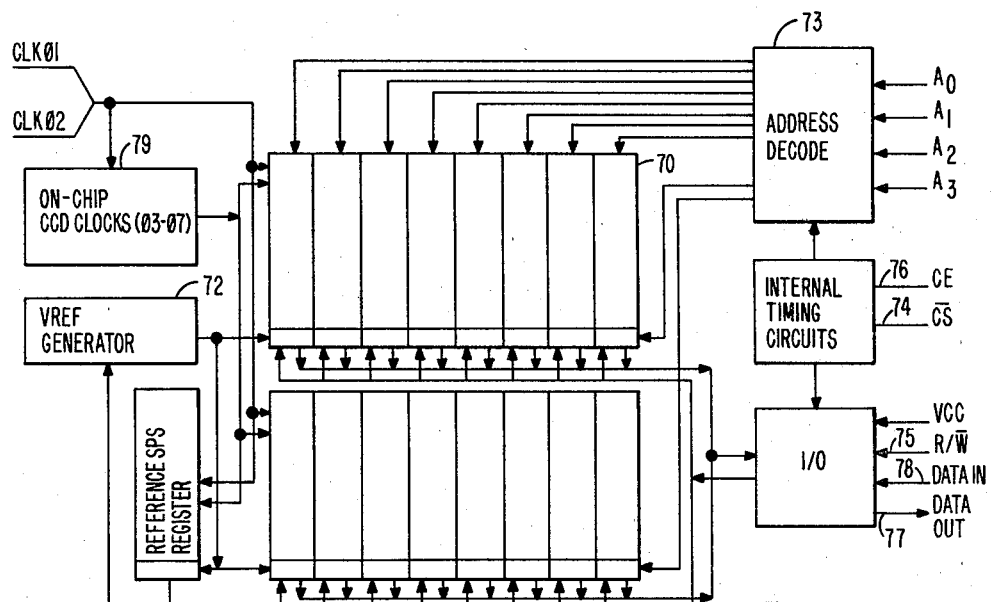
FIG. 3 is a block diagram of the prior art memory of FIG. 2.

The exemplary memory is illustrated in FIG. 3 and is internally organized as 16 addressable 4 kilobit loops 70, each comprising 4,096 bits. Each loop 70 consists of the 4,096-bit serial-parallel-serial CCD shift register for data storage, a regenerator for refreshing the data, and an I/O interface circuit for data transfer to and from the loop. A nonaddressable register 71 is used in conjunction with a reference voltage generator circuit 72 to generate a reference voltage compensated for leakage current that is used by the regenerator at each loop. Data is read at the loop register output by setting the appropriate address in address decode circuit 73, by setting chip select line 74 low and read/not-write line 75 high, and then pulsing chip enable line 76. The data will be supplied at data output line 77 in serial fashion one data delay time following the rise of the chip enable pulse. For writing data into a particular loop, the address input is set as before, the data supplied at line 28, chip select line 74 and read/not-write 75 are set low, and then chip enable is pulsed. Read and write operations may be conducted during succeeding cycles on the same or different loops as will be explained. The loops are operated by external clocking shown in the form of two phases as supplied to the on-chip clock 79, the two phases comprising a memory cycle.

Several different clocking modes are possible, any of which may be made to operate in the environment illustrated in FIG. 2. The simplest to explain is the clocked-serial mode in which the clock enable input 76 is pulsed at the chip clock frequency while the address inputs are held constant in the appropriate phase so that all 4,096 bits of a given loop are accessed sequentially before addressing the next loop, and the memory input/output data rate equals the chip clock frequency.

Other memories may be employed or modified to read on one cycle while writing on the same or adjacent clock cycles and be employed in the present invention. An example of a semiconductor shift register memory which may be employed with the present invention is that described in the IBM Technical Disclosure Bulletin, Vol. 11, No. 1, June 1968, pp. 12–13a by Anacker, "Memory Employing Integrated Circuit Shift Register Rings." A second decoder and MAR will be required to allow reading and writing on the same or succeeding clock cycles.

Figure 4:
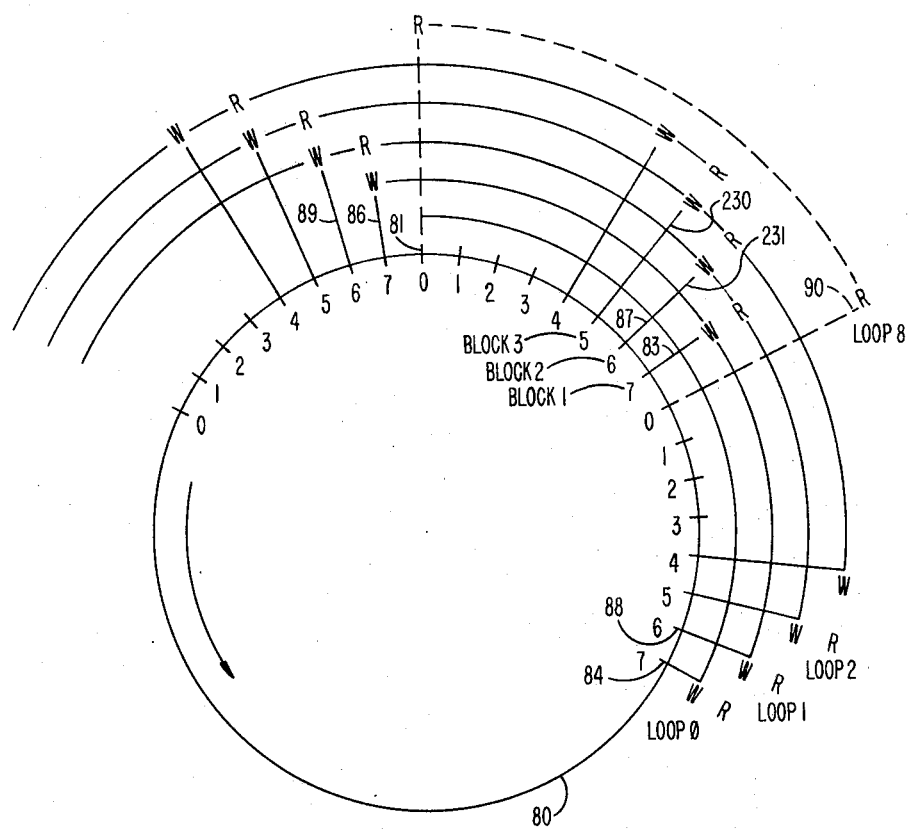
FIG. 4 is a diagrammatic illustration of the functioning of the memory of FIG. 3 in conjunction with the apparatus of FIG. 2.

FIG. 4 illustrates the operation of the circuitry of FIG. 2. Specifically, the circle 80 represents a complete cycle of a loop 70 of the memory 16. The bits in a single loop of the memory are organized as a series of slots, the slots each representing a bit in one block out of eight interlaced blocks of data. Thus, each bit slot designated "O" is a slot belonging to the "O" block of data. Point 81 in the loop may be considered as the I/O interface for the loop. Thus, a bit slot from block O first appears at the interface, followed by a bit slot from interlaced block 1 of the loop. Inasmuch as the entire loop contains 4,096 bits, each of the eight interlaced blocks contains 512 bits. The interlaced blocks are considered to be in the loop 80 in the sequence of block O first followed by block 1, etc. until the last block which is block 7. Hereinafter, it is assumed that 4096 bits is one record.

However, the addressing and counter circuitry 41 of FIG. 2 is arranged so that the writing into or reading out of the memory of FIG. 4 occurs one bit time earlier for each loop or cycle of the memory. Thus, the data is written ("W") first in the slots of block 7 during loop O, and next, during loop 1 in the slots of blocks 6, etc.

Referring jointly to FIG. 2 and 4, the cyclic redundancy character shift registers 51 and 52 are reset by a signal on line 55 from the command decode circuitry 40. Then, in response to the appropriate commands and data, command decode circuit 40, gates the first byte of incoming data to buffer 26, and the addressing and counter circuitry 41 addresses the appropriate shift register in memory 16. Next, the second byte of data is gated by the command decode circuitry to buffer 27, while the contents of buffer 26 is gated thereby to serializer 20. Coincident with a start of memory clock signal, explained hereinafter, addressing and counter circuitry 41 supplies the appropriate signals to the addressed shift register in memory 16 to write data into the first slot of block 7 and serializer 20 supplies the first bit of the byte of data on output 28 to the memory. The bit is supplied on line 28 while the memory cycles from slot 0 or 81 to slot 7 or 83. One bit time later, serializer 20 supplies the second bit on line 28, and the addressing and counter circuitry 41 supplies the appropriate signals to enable the selected shift register to write in the next appearing slot 7, designated as number 84. This continues until the entire 8-bit byte has been serialized and stored. Then, command decode circuitry 40 supplies the byte contained in buffer 27 to serializer 20 and loads the third byte from input 24 into buffer 26. The serializing continues for the subsequent byte and for other subsequent bytes until the 512th bit has been recorded in the slot designated as 86. At this time, the second cycle through the loop 80 of the memory 16 begins. The addressing and counter circuitry 41 keeps track of the functioning of memory 16 and notes when the next cycle begins. The circuitry thus controls the timing signals so as to cause the next bit appearing on line 28 from serializer 20 to be written into the loop during slot 6, designated as 87. Circuitry 41 also functions to provide the appropriate addressing and timing signals to cause the bit appearing at slot 7, designated 83, to appear at the memory input/output interface and provides a signal on line 42 to strobe memory read circuit 30 to read the bit from slot 7. This will continue completely around the loop, writing the next bit from serializer 20 in the subsequent slot 6, designated as 88, and reading the subsequent slot 7, designated as slot 84, etc., until the loop is completed by the writing of a bit from serializer 20 in the slot 6 designated as 89 and reading the data from slot 7 of the memory, designated as 86.

The interleaved writing of data in one slot and reading of data in the next slot continues through six more complete cycles of the memory through the loop designated as 80. At that point, all eight blocks of data will have been written in a memory loop 80 to complete a record of 4,096 bits.

During the ninth cycle of the shift register (loop 8), no data will be written into the memory from serializer 20. Rather, the addressing and counter circuitry 41 will control memory 16 and will operate the strobe input from line 42 of memory read circuitry 30 so as to read the data from slot O, designated as 81 and as 90 all the way around the loop, this data having been written in the previous complete cycle or loop.

Each bit that was supplied on line 28 and written into the shift register in memory 16, was also supplied to the write cyclic redundancy character shift register 51. The shift register, automatically reset to all ones by the original signal on line 55, shifted this data with the feedback as described above to calculate the redundancy character. Similarly, each bit read from the shift register in memory 16 by the memory read circuitry 30 is supplied over line 54 to read cyclic redundancy character shift register 52. This shift register was also reset to all ones by the reset signal on line 42 and shifted the received data therethrough with the identical feedback as shift register 51, generating the cyclic redundancy character.

Upon completion of the ninth complete cycle or loop (loop 8) of memory 16, the addressing and counter circuitry 41 supplies the end of record signal on line 44 to compare circuit 53. As described above, all of the data for the full eight blocks of the memory have been supplied on line 28 to memory 16 and to shift register 51. Similarly, all eight blocks of data have been read by memory read circuit 30 and supplied serially on line 54 to shift register 52. Both cyclic redundancy characters have therefore been calculated. Appearance of the signal on line 44 causes compare circuitry 53 to compare the contents of the two shift registers 51 and 52. This completes the readback check. Should the comparison indicate that the two shift registers are equal, the data is correct as stored in memory 16 and no signal is supplied on line 60 to status register 61. The status register therefore stays in its normal status indicating that there has been no unequal comparison.

A subsequent status inquiry indicated by a signal on line 62 causes the status register to supply this "equal" status bit pattern over the data bus 32.

However, should the contents of the two shift registers 51 and 52 be unequal, comparison circuit 53 supplies an output signal on line 60 to status register 61. This switches the status register 61 to a different bit pattern which indicates that the comparison is unequal. Upon a status inquiry indicated by a signal on line 62, the status register will supply this "unequal" indicating bit pattern on data bus 32.

The system illustrated in FIG. 2 is thus able to provide a readback check of the data being stored in memory 16 while that data is being written into memory, and to indicate to the system whether that data as stored in memory 16 is in error, only a short time after the last of the data is supplied thereto. Should the data be in error, it can be reaccessed from input buffer 14 in FIG. 1 before the data in the buffer is overlayed by subsequently appearing data from transmitter 10. The data is therefore checked for accuracy prior to the original data from the source 14 having been lost.

Figure 5:
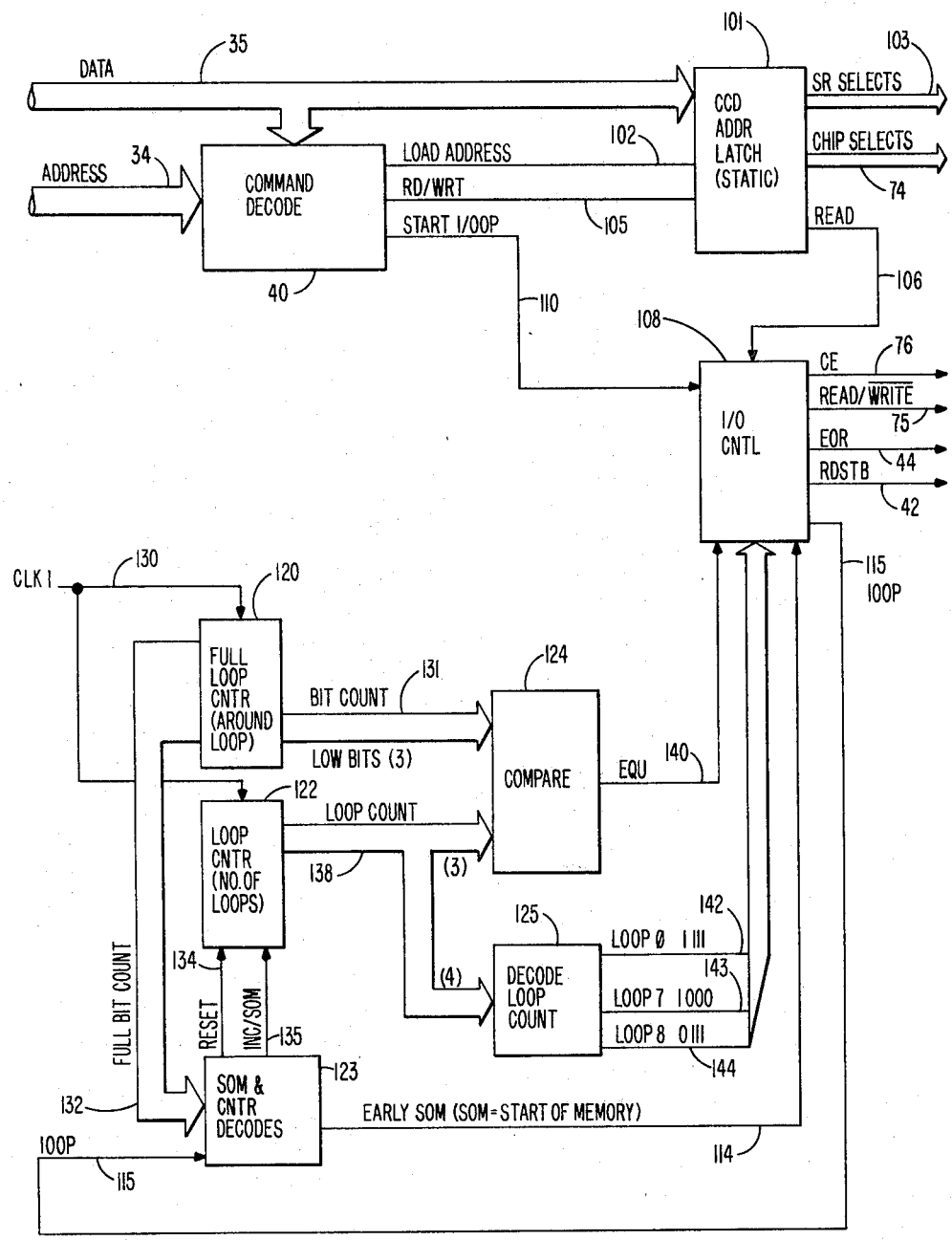
FIG. 5 is a block diagram of the addressing and counter circuitry of FIG. 2.

FIG. 5 illustrates the details of the addressing and counter circuitry 41 in FIG. 2. The circuitry includes CCD address latch 101 which responds to a signal on line 102 from command decode circuit 41 to load in the latch the data on bus 35. The latch supplies this data over lines 74 and 103 to address a specific shift register on a specific chip. Subsequent to loading the address, command decode circuitry 41 will indicate whether the operation to be performed with the memory is a read of the memory or a write data into the memory. This signal is supplied on line 105 to the latch 101. This signal is latched by circuit 101 and supplied on line 106 to I/O control circuit 108. The system indicates when it wishes the input or output operation to the memory to begin by providing a command to command decode circuit 40. Circuit 40 decodes this command and provides a signal on line 110 to I/O control circuit 108. Data transfer does not occur immediately, however. Instead, the transfer must wait until memory 16 completes its present cycle and comes to a home position called "start of memory." Counter outputs sufficiently in advance of the start of memory are supplied to the system to control the transfer of data at the proper time on bus 24 to buffers 26 and 27. Thus, the proper byte of data will be loaded in serializer 20 in time for the start of memory and transfer of data. The serializer 20 in FIG. 2 is controlled by a signal on line 112 derived from an "early start of memory" signal appearing on line 114 in FIG. 5. This will be explained with reference to FIG. 6. I/O control 108 also responds to the early start of memory signal on line 114 and the start I/O signal on line 110 to provide the "IOOP" signal on line 115. This signal remains "on" in a latched condition so long as the input-/output operation continues with the present record. The I/O control circuit 108 also supplies the chip enable pulses on line 76 to the memory 16, as well as the read/not-write signal on line 76 to memory 16. The I/O control 108 also supplies the read strobe signal on line 42 to the memory read circuit 30 in FIG. 2.

The addressing and counter circuitry 41 of FIG. 2 as shown in detail in FIG. 5 also includes a full loop counter 120, a loop counter 122, a decode circuit 123, a compare circuit 124, and a decode loop count circuit 125.

Counter 120 runs of a clock signal which is supplied at the CCD shift register shift rate on line 130. Counter 120 is a full loop binary counter of 4,096 bits for tracking the current position in the CCD memory. The bit count of the low order bits of counter 120 are supplied on bus 131 to one input of compare circuit 124. These bits designate the slot present at the I/O interface of the selected shift register of memory 16. The full bit count from counter 120 is supplied on bus 132 to decode circuitry 123. Circuit 123 decodes the bit count received on cable 132 to detect the start of memory point and to detect the point one bit position prior to the start of memory point. This one bit prior point is called "early start of memory" and the early start of memory signal is supplied on line 114 to I/O control circuit 108. The resultant I/O operation signal on line 115 is supplied to decode circuit 123 and ANDed with the start of memory signal to supply a reset signal on line 134 to loop counter 122. Subsequent start of memory signals are supplied by decode circuitry 123 on line 135 to loop counter 122.

Loop counter 122 is a four bit binary counter and the reset signal received on line 134 resets the counter to the all one's state. The output of the loop counter 122 is supplied on bus 138 with all four bits going to decode loop count circuit 125 and the three low order bits going to compare circuit 124. Compare circuit 124 compares the low bits on bus 131 to the low bits on bus 138. Line 130 is also connected to counter 122 to provide the same clock signals as are used to step counter 120. The clock signals control gates which ensure that the inputs to compare circuit 124 are synchronized in order to allow a valid comparison. Each subsequent start of memory signal decoded by circuit 123 is supplied on line 135 to loop counter 122 and decrements the loop counter. Thus, counter 122 down counts each time around the loop of the shift register in memory 16.

Compare circuit 124 compares the output supplied on busses 131 and 138. Should the comparison be equal, the circuit supplies a signal on line 140 to I/O control circuit 108. This signal indicates that the loop or block currently being monitored by loop counter 122 has a corresponding bit slot present at the input/output interface of the appropriate shift register in memory 16.

Decode loop count circuit 125 detects specific loops or cycles of the memory 16. The first or "loop O" of the memory represented by the all ones count from counter 122 is decoded and an output signal is supplied on line 142 to I/O control circuit 108. Loop 7 is represented by the binary output 1000 from counter 122 and, when decoded, circuit 125 supplies a signal onto line 143 to the I/O control 108. Loop 8 which is actually the ninth loop and a duplicate of loop 0 but with the four bit output of counter 122 appears as the binary output 0111 is decoded and a signal supplied on output line 144 from counter 125 to the I/O control circuit 108.

I/O control circuit 108 supplies the operating signals to memory 16, to memory read circuit 30 and to compare circuit 53 in FIG. 2. The I/O control circuit 108 is shown in detail in FIG. 6 and will be described in reference to the timing diagram of FIG. 7.

The I/O operation is controlled by the "IOOP" signal from I/O operation control latch 150. Latch 150 is set by the combination of two signals, the start I/O signal from the command decode circuit 40 in FIG. 5 on line 110 and by the early start of memory signal from decode circuit 123 in FIG. 5 on line 114. Thus, the start I/O signal indicates that an input or output operation is to be done, and the early start of memory signal indicates when the memory is in the position such that the operation can actually begin. Latch 150 responds to the coincidence of these two signals by supplying the IOOP, or "input/output operation" signal on line 115. This is the signal that is supplied to decode circuit 123 so as to allow the resetting thereby of loop counter 122 by the reset signal on line 134 in FIG. 5. The IOOP signal is also supplied to the inputs of other circuitry in FIG. 6, specifically input 152 of AND circuit 153, input 154 of AND circuit 155, and input 156 of AND circuit 157. This signal remains up for the duration of the input or output operation. When IOOP is inactive, it serves as a preset and hold purpose, releasing the responsive circuitry when it comes up.

Latch 150 is reset at early SOM by either a loop 8 signal at input 160 from line 144 (see FIG. 5), indicating that a write operation has been completed, or the ending of input 161 and 162, indicating a read operation signal from line 106 in combination with the loop 7 signal on line 143 (FIG. 5), which indicates the end of a read operation. Either of these two reset signals, in conjunction with the early SOM signal, will reset latch 150 and turn off the input/output operation signal on line 115. Thus, the signal appears on line 115 only so long as the particular input or output operation is in process.

Figure 6:
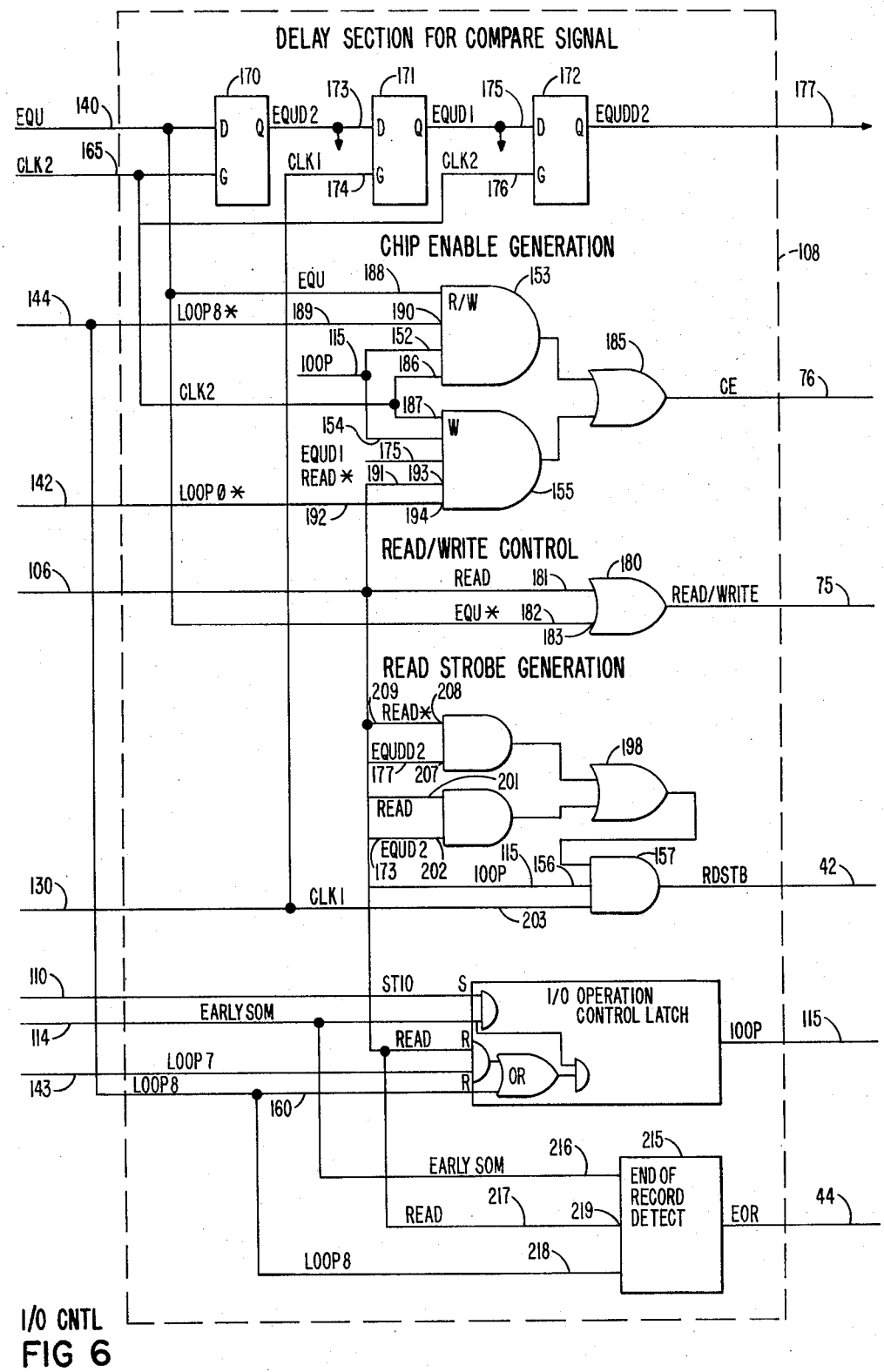
FIG. 6 is a block diagram of the I/O control circuitry of FIG. 5.
Figure 7:
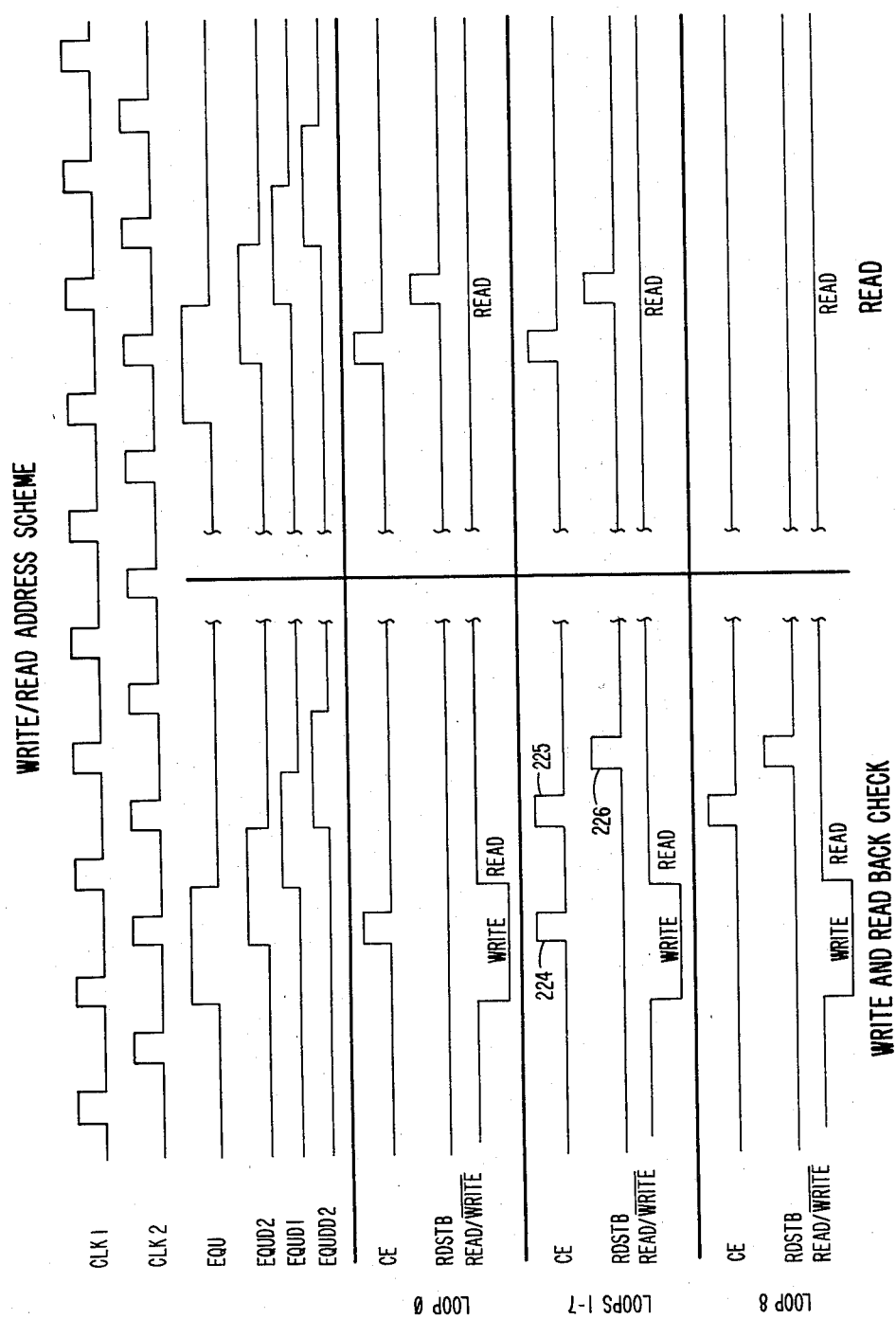
FIG. 7 is a timing diagram of the circuitry of FIGS. 2-6.

Two basic clock signals are provided as shown in FIG. 7, comprising clock 1 and clock 2 signals at the same frequency but in alternate phases. The clock 1 signals are supplied on line 106 in FIG. 6 and the clock 2 signals are supplied on line 165. As shown in FIG. 5, full loop counter 120 is incremented by the clock 1 signal on line 130 and the "equal" output from compare circuit 124 on line 140 is on so long as the counts from busses 131 and 138 are equal. This means that the signal on line 140 shown as wave form "EQU" in FIG. 7 comes up with the clock 1 signal which incremented counter 120 to the desired count and remains on until the next clock 1 signal, which increments the counter to the next and not presently desired count.

This "equal" signal is supplied to a delay section in the I/O control circuit shown in FIG. 6. The delay section includes circuits 170, 171, and 172. Circuit 170 is connected to the clock 2 input line 165 as well as to the equal input line 140 and supplies the output signal illustrated in FIG. 7 as "EQUD2" upon the occurrence of both the equal signal and the clock 2 signal. This signal remains until the clock 2 signal again rises. Circuit 171 is similar to 170, providing the output shown in FIG. 7 as "EQUD1" in response to the appearance of the EQUD2 signal at input 173 together with the rise of the clock 1 signal on input 174. The output remains until the rise of the next subsequent clock 1 signal at input 174. Circuit 172 is similar, providing the "EQUDD2" signal on output line 177 in response to the appearance of the EQUD1 signal on line 175 in conjunction with the clock 2 signal at input 176 thereof. Again, the output signal on line 177 stays up until the next rise of clock 2 at input 176, as shown in FIG. 7. These signals on lines 173, 175, and 177 are supplied to the remaining circuitry of FIG. 6. The read/not-write signal supplied on line 175 to the shift registers of memory 16 comes from OR circuit 180. The first input to circuit 180 is read line 106 from the CCD address latch 101 in FIG. 5, which is supplied to input 181; and the other input is the equal "EQU" input line 140 which is supplied at input 182 to inverter 183, where it is inverted and supplied as the other input to the OR circuit 180. Thus, if CCD address latch 101 supplies a read signal on line 106, OR circuit 180 will supply an output signal on line 75. Similarly, whenever the equal signal on line 140 from compare circuit 124 in FIG. 5 is off, OR circuit 180 will supply a signal on line 175. Line 75 is connected to all of the shift register chips in memory 16, as shown in FIG. 3. The presence of a signal on line 75 indicates to the memory that data may be read out from the memory during the chip enable pulse, and only the absence of a signal on line 76 indicates that data may be written into the memory during the chip enable pulse. Thus, only when the read signal is not present on line 106 and when the equal signal is on line 140 does OR circuit 180 drop the output signal on line 75, enabling the writing of data into the memory. The read/not-write signal is illustrated for loop O, loop 7, and loop 8 in FIG. 7.

The chip enable signal is generated by AND circuits 153 and 155 and OR circuit 185 in FIG. 6. The chip enable circuitry supplies the chip enable pulse for a memory read operation or for a memory write operation and the readback check operation. The chip enable pulse is in phase with the clock 2 signal as a result of the clock 2 signal being supplied to both input 186 of AND circuit 153 and input 187 of AND circuit 155. Both AND circuits are only operational during the I/O operation function as indicated by the previously discussed supply of the "IOOP" signal from line 115 to input 152 of AND circuit 153 and to input 154 of AND circuit 155. AND circuit 153 has as its other inputs the equal signal from line 140 at input 188 and the loop 8 signal from line 144 at input 189. The loop 8 signal is inverted by invertor 190 and supplied to the AND circuit. AND circuit 153 therefore supplies the chip enable pulse at the clock 2 phase every time the equal signal is up with the exception of the processing of the loop 8 of the memory. This pulse will allow data to be written in or read out of memory, depending upon the signal on line 75.

AND circuit 155 supplies the chip enable pulses for the readback check operation of a write operation. The other inputs to AND circuit 155 include the "EQUD1" signal from circuit 171 on line 175, the read input from line 114 at input 191, and the loop O input from line 142 at input 192. The latter two signals are inverted, respectively, by inverters 193 and 194. AND circuit 155 therefore supplies the chip enable pulse during the clock 2 phase delayed one complete clock cycle coinciding with the output of "EQUD1" only during a write operation (no read signal) and on all loops except loop O. This allows for the readback check. The output of AND circuits 153 and 155 are ORed by OR circuit 185 and supplied on line 76.

To complete the readback check or read operation, the appropriate read strobe signal is generated and supplied on line 52 to memory read circuit 30 in FIG. 2 by AND circuits 196, 197 and 157, and OR circuit 198. Referring to FIG. 7, the read strobe pulses are delayed from the chip enable pulses sufficiently to allow operation of the input/output interface circuitry of the shift registers of memory 16. This is accomplished by the delay circuits 170 and 172. Specifically, the read strobe for the normal read operation is generated by AND circuit 197 from the signals at input 201 and 202. Input 201 comprises the read signal from line 106, and input 202 comprises the output line 173 from delay circuit 170. This signal is transmitted by OR circuit 198 to AND circuit 157. AND circuit 157 has as one input the I/O operation signal on line 115 at input 156, and as the other input, the clock 1 signal from line 130 at input 203. Thus, at the clock 1 phase delayed from the original clock 2 phase chip enable signal on line 76, the AND circuit 157 supplies the read strobe on line 42. Similarly, AND circuit 196 generates the read strobe for the readback check operation. Input 205 of AND circuit 196 is connected to the read line 106, and input 207 is connected to line 177, comprising the "EQUDD2" output of circuit 172. The read signal is inverted by inverter 208 and supplied to the AND circuit. AND circuit 196 therefore supplies its output during the "EQUDD2" signal shown in FIG. 7 during the time when the read signal on line 106 is down, indicating a write operation is in progress. This signal is transmitted by OR circuit 198 to AND circuit 157. As before, AND circuit 157 supplies the read strobe output signal upon the occurrence of the next clock 1 signal appearing at input 203 thereof.

Lastly, the circuitry of FIG. 6 supplies the end of record signal on line 44 to indicate to the comparison circuit 53 in FIG. 2 that the entire record has been written and read back and that the comparison circuit is to do a comparison of the two cyclic redundancy check characters. This end of record signal is supplied by AND circuit 215. This AND circuit has as its inputs the early start of memory signal from line 114 at input 216, the "read" input signal from line 106 at input 217, and the loop 8 signal from line 144 at input 218. The read signal at input 217 is inverted by inverter 219 and supplied to the AND circuit. The end of record signal on line 44 is thus supplied at the end of loop 8 when a write operation is in progress. Specifically, the inverted "read" signal at input 217 indicates that a write operation is in progress. A signal at input 218 indicates that loop 8 is being processed, which is the last readback check operation for a block of data. The early start of memory signal on line 216 indicates that the last bit of the loop 8 data is being processed. As this signal goes down, AND circuit 215 supplies the end of record signal on line 44.

Referring now primarily to FIG. 7, the left hand side represents the write operation with the accompanying readback check, whereas the right hand side represents the straight read operation. During loop O the first block of data will be written into the associated slots of the selected shift register of memory 16. Thus, circuit 180 drops the read/not-write output on line 75 during the occurrence of the "equal" pulse on line 140. The actual write operation then occurs in the shift register upon the occurrence of the following chip enable signal on line 76, supplied by AND circuit 153 and OR circuit 185. As this is the first block of datato be written into the memory, no readback check occurs, and therefore, no read strobe signal is supplied on line 42.

For loops 1 through 7, the data is first written into one slot for the associated loop and then a readback check is conducted of the next available slot, representing the previously written slot. Thus, as in loop 0, the read/not-write output on line 75 is dropped during the occurrence of the equal signal. The chip enable signal from AND circuit 153 and OR circuit 185 then causes the appropriate shift register to write during that bit time in the desired slot. During the loops other than 0, a readback check of the previously recorded block is required. Therefore, as the equal signal drops, OR circuit 180 reinstates the read signal on line 75, and AND circuit 155 and OR circuit 185 cause another chip enable to occur at the appropriate time to read out the next occurring bit from the shift register in memory 16. This bit is from the next slot, which is the data from the previously recorded slot. The data appears at the input/output interface of the shift register, and AND circuit 157 supplies the read strobe signal on line 42 to memory read circuit 30 in FIG. 2, which reads the bit from memory 16. Using loop 2 as an example, and referring additionally to FIG. 4, the first CE pulse 225 causes the bit 230 to be written in slot 5, and CE pulse 225 causes bit 231 from slot 6 to appear at the I/O interface, to be strobed by read strobe 226 for the readback check. Thus, continuously during loop 2, data is written into the shift register for block 3 while the data of block 2 previously written in slot 6 is read back for checking.

In loop 7, the last of the record is written into the shift register. Thus, in loop 8, no data is to be written. Specifically, the loop 8 signal on line 144 from decode loop count circuit 125 in FIG. 5 is supplied on line 189 in FIG. 6 and inverted by inverter 190 to disable AND 153 and terminate the CE pulses on line 76. Referring to FIG. 7, the absence of the CE pulse prevents writing into the shift register despite the drop of the read/not-write signal on line 75. The I/O operation is still a write operation, however. Thus, the inputs to AND circuit 155 create the CE pulse 230 and the inputs to AND circuits 196 and 157 cause read strobe pulse 231 in order to accomplish the readback check of the data stored during loop 7.

The read operation in FIG. 7 is much simpler, the presence of the read signal on read/not-write line 75 enbling the selected shift register to read out upon occurrence of the chip enable signal concurring with clock phase 2 on line 76. Each bit then appears at the appropriate input/output interface of the shift register and the subsequently occurring read strobe signal on line 42 operates memory read circuit 30 to latch the data and supply it to deserializer 21. All eight blocks of data for a complete record are read during the first eight loops of the memory, therefore, AND circuit 153 and OR circuit 185 supply no chip enable signal on line 76 during loop 8.

The particular circuitry of FIGS. 5 and 6 would have to be modified somewhat to accommodate other memories 16 or different clocking modes of the particular shift registers of FIG. 3. Other clocking modes could easily be utilized and are a matter of choice re speed matching or energy saving. All are considered the same "mode." Given the above information, such modification is within the skill of one of ordinary skill in the art.

Figure 8:
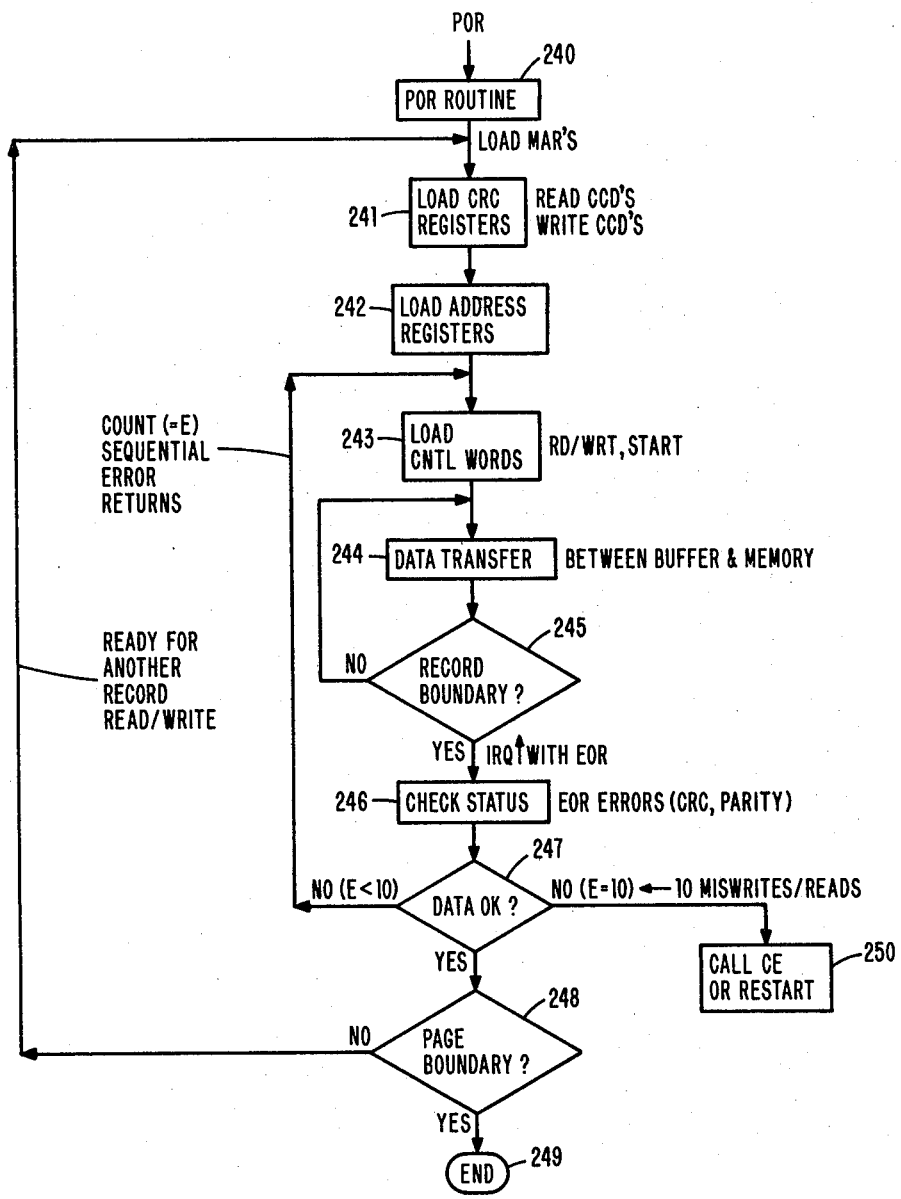
FIG. 8 is a flowchart for the apparatus of FIGS. 2-6.

An exemplary flowchart for the apparatus of FIGS. 2-6 is shown in FIG. 8. Step 240 is the entry into the routine, resulting in the presetting of the CRC registers to all ones in step 241, and loading of the appropriate addresses and commands and starting the I/O operation in steps 242 and 243. The data transfer 244 then begins and continues 245 until the record has been loaded and read back. The read back check has been completed at the end of record and the status register 61 loaded. Step 246 then checks the status register. If the status register signals 247 that the data is equal, then step 248 inquires as to whether more data is to be received by the buffer and transferred, and if so returns to step 241. If not, the I/O operation is at an end 249.

Should the status signal 247 that the data written in memory is in error, a return is made to step 243 and the data still in the buffer is retransferred to the memory. A number of retries may be made should the transfers continue to result in error signals. Only after a selected number of erroneous retries would a "hard error" signal 250 be provided.

Thus, the readback check and the return from step 247 to step 243 allow the data in the buffer to be rewritten into the memory before the data in the buffer is lost.

Although the invention is most clearly advantageously employed to check data originating with a distant transmitter 10, other sources such as a facsimile scanner where detailed data is not precisely duplicated in subsequent scans due to timing or illumination differences present the same type of problem in that the erroneously stored data could not be reobtained by rescanning. Thus, it is envisioned that the present invention may be advantageously employed with various sources of data 10 which presents the same type of problem.

While the invention has been particularly shown and described with reference to the above preferred embodiments thereof, it will be understood by those skilled in the art that various changes in form and details may be made therein without departing from the spirit and scope of the invention.

What is claimed is:

1. A data storage means for storing data received from a source comprising:
  a cyclic memory means having a plurality of data blocks for storing data;
  writing means for sequentially writing said received data in said plurality of blocks of said cyclic memory means over a corresponding plurality of cycles of said memory means;

reading means for reading after a one-cycle delay and simultaneously with said writing during ones of said plurality of said cycles, said data written in each said block of said cyclic memory means during the immediately preceding cycle; and means for comparing said received data and said data read by said reading means to detect any difference therebetween.

2. The data storage means of claim 1 wherein:

said writing means comprises means for sequentially writing said data in a sufficient plurality of said blocks during a corresponding plurality of cycles to store a complete data record; and said reading means comprises means for sequentially reading said data stored in said plurality of blocks in a like plurality of cycles beginning with the second cycle and ending with the cycle immediately succeeding said corresponding plurality of cycles of said writing means.

3. The data storage means of claim 2 wherein:

said means for comparing additionally comprises signaling means for signaling the detection of any said difference.

4. The data storage means of claim 1 wherein:

said cyclic memory means includes a plurality of data slots, each said data block comprising a set of interleaved said data slots; and said writing means and said reading means comprise means operable to read and to write different said data blocks comprising different said interleaved data slots of said memory means during the same cycles of said memory means.

5. The data storage means of claim 4 wherein:

said writing means additionally comprises means for sequentially writing said data in a different selected data block comprising a set of said interleaved data slots in each of a successive plurality of cycles to store a data record; and said reading means additionally comprises means for sequentially reading said data from previously written said data blocks, each comprising a set of said interleaved data slots, in each of a like successive plurality of cycles beginning with the second cycle and ending with the cycle immediately succeeding said successive plurality of cycles of said writing means.

6. The data storage means of claim 5 wherein:

said data slots of said cyclic memory means each comprise the data storage for one bit of data.

7. The data storage means of claim 5 wherein:

said means for comparing additionally comprises signaling means for signaling the detection of any said difference.

8. An input check apparatus for a cyclic memory means having a plurality of data blocks which stores data received from a source in a series of said data blocks over a continuous plurality of cycles of the memory means, one said data block corresponding to one said cycle, and which retrieves said stored data from said series of said data blocks over a like plurality of cycles of the memory means coincident with said continuous plurality of cycles, said input check apparatus comprising:

receive check means for also receiving said received data during said continuous plurality of cycles of said memory means;

read check means for receiving, after a delay of one cycle, said retrieved data corresponding to said received data during said plurality of cycles, beginning with the cycle immediately succeeding the first or said continuous plurality of cycles; and means responsive to said receive check means and said read check means for comparing said received data and said retrieved data to detect any difference therebetween.

9. An input check apparatus for checking data as stored in a cyclic memory means, said cyclic memory means arranged to store received data in a plurality of data slots in an interleaved fashion in succeeding ones of the cycles thereof, each series of said interleaved data slots in one said cycle comprising a data block, and arranged to retrieve said interleaved stored data by said data blocks over a like plurality of the cycles of the memory means coincident with said succeeding cycles, said input check apparatus comprising:

receive check means for also receiving said received data as stored in said interleaved fashion;

read check means for detecting in said like plurality of said cycles, beginning with the cycle immediately succeeding the first of said succeeding cycles, said retrieved data comprising data blocks corresponding to said interleaved stored data; and means responsive to said receive check means and said read check means for comparing said received data and said retrieved data to detect any difference therebetween.

10. The input check apparatus of claim 9:

wherein said read check means is additionally arranged to receive a complete data record as received by said memory means and stored thereby in said interleaved fashion over a plurality of cycles, comprising a corresponding plurality of said data blocks, and to generate said first check character therefrom;

additionally including reading means for reading said retrieved data during each of said like plurality of cycles of said memory, said retrieved data comprising said interleaved data stored therein in the immediately preceding cycle; and said read check means is arranged to receive said data from said reading means and arranged to generate said second check character from the complete data record received from said reading means.

* * * * *